US008868844B2

(12) United States Patent
Nutter et al.

(10) Patent No.: US 8,868,844 B2
(45) Date of Patent: Oct. 21, 2014

(54) SYSTEM AND METHOD FOR A SOFTWARE MANAGED CACHE IN A MULTIPROCESSING ENVIRONMENT

(75) Inventors: Mark Richard Nutter, Austin, TX (US); Dean Joseph Burdick, Austin, TX (US); Barry L. Minor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1457 days.

(21) Appl. No.: 12/145,551

(22) Filed: Jun. 25, 2008

(65) Prior Publication Data

US 2009/0327613 A1 Dec. 31, 2009

(51) Int. Cl.
*G06F 12/08* (2006.01)

(52) U.S. Cl.
CPC .................................. *G06F 12/0875* (2013.01)
USPC ............ 711/141; 711/118; 711/122; 711/128

(58) Field of Classification Search
CPC .................................................. G06F 12/1018
USPC .................................. 711/118, 122, 128, 141
See application file for complete search history.

(56) References Cited

U.S. PATENT DOCUMENTS 5,682,512 A 10/1997 Tetrick
5,956,753 A 9/1999 Glew et al.
5,983,341 A 11/1999 Cheong et al.
7,069,389 B2 * 6/2006 Cohen .......................... 711/135
7,461,210 B1 * 12/2008 Wentzlaff et al. ............ 711/135
8,601,234 B2 * 12/2013 Plondke et al. ............... 711/207
2005/0268038 A1 * 12/2005 Yasue .......................... 711/118

OTHER PUBLICATIONS

Erik G. Hallnor and Steven K. Reinhardt. 2000. A fully associative software-managed cache design. In Proceedings of the 27th annual international symposium on Computer architecture (ISCA '00). ACM, New York, NY, USA, 107-116.*

Michel Cekleov and Michel Dubois. 1997. Virtual-Address Caches Part 1: Problems and Solutions in Uniprocessors. IEEE Micro 17, 5 (Sep. 1997), 64-71. DOI=10.1109/40.621215 http://dx.doi.org/10.1109/40.621215.*

* cited by examiner

*Primary Examiner* — Matthew Bradley
*Assistant Examiner* — Ramon A Mercado
(74) *Attorney, Agent, or Firm* — James L. Baudino

(57) ABSTRACT

A method for implementing a software-managed cache comprises determining an object identifier (ID) for each of a first set of objects of a plurality of objects resident in a local memory, to generate a first cache table, the first cache table comprising a plurality of entries. Each object comprises an object ID and an effective address. The method receives a request for an object, the request comprising an object ID. The method compares the received object ID with the entries in the first cache table. In the event the received object ID matches an entry in the first cache table, the method returns the matching entry in response to the request. In the event the received object ID does not match an entry in the first cache table, the method calculates an effective address in the local memory of the object associated with the object ID.

19 Claims, 3 Drawing Sheets

SYSTEM AND METHOD FOR A SOFTWARE MANAGED CACHE IN A MULTIPROCESSING ENVIRONMENT

TECHNICAL FIELD

The present invention relates generally to the field of computer architecture and parallel processing and, more particularly, to a system and method for a software managed cache in a multiprocessing environment.

BACKGROUND OF THE INVENTION

Modern electronic computing systems, such as microprocessor systems, typically include a system bus connecting a memory, one or more processing units, and an input/output (I/O module). FIG. 1, for example, illustrates an exemplary multiprocessing system 100 that includes multiple processing units. System 100 includes an otherwise conventional system bus 102 coupled to an otherwise conventional memory 104. System 100 includes an otherwise conventional I/O module 106 coupled to bus 102.

System 100 also includes an otherwise conventional main processing unit (MPU) 110. As illustrated, system 100 includes an otherwise conventional main memory unit (MMU) 112 coupled to bus 102 and an otherwise conventional level two (L2) cache 114 coupled to MMU 112. Generally, MPU 110 accesses memory 104 through MMU 112 and L2 cache 114.

System 100 also includes a synergistic processing unit (SPU) 120. SPU 120 can be an auxiliary general purpose processing unit (PU) or a special purpose PU. System 100 also includes an otherwise conventional direct memory access (DMA)/MMU 122 coupled to bus 102 and an otherwise conventional local store 124. Generally, SPU 120 accesses memory 104 through DMA 122, and stores selected information in local store 124. Local store 124 is frequently much smaller than L2 cache 114. As illustrated, system 100 includes one additional processing unit, SPU 120. One skilled in the art will understand that many multi-processor systems employ more than two processing units.

As shown, a modern complex processor system includes a large, unified memory (memory 104), accessible by the main processing unit (MPU 110) through a hierarchy of coherent caches (e.g., L2 cache 114), which hide and reduce memory access latency. When MPU 110 references data in cache 114, it does so by "effective address." Typically, the system hardware looks up the effective address in a cache directory, and if found, returns the data referenced by that effective address. If the requested effective address is not found in the cache directory (a "cache miss"), the system incurs a latency penalty in retrieving the requested data into the cache from some higher level in the memory hierarchy. The illustrated L2 cache 114 is an example of a "hardware cache," where the caching and lookup functionality is implemented in hardware.

The secondary processing unit 120, however, does not have a hardware L2 cache. As such, some systems employ a "software managed cache," which emulates a hardware cache in local store 124. In some systems, the operating system provides the cache functionality; in other systems the applications must provide their own memory management and cache functionality.

For example, a common cache-supported computational task is to sum a sequential array of data elements:

```
for (i=0; i<number_of_elements; i++)
    sum += a[i];
```

For a simple processing unit using conventional managed cache techniques, the sequential access above becomes:

```
for (i=0; i<number_of_elements; i++)
    sum += cache_read(&a[i]);
```

But conventional managed cache techniques suffer from a number of disadvantages. First, as described above, conventional software caches mimic hardware caches and maintain a directory of "effective addresses." As such, conventional software managed caches, before determining a cache hit/miss, must compute the effective address to pass to the cache lookup function:

```
/* STEP 1: compute EA */
ea = a + i * sizeof (data);
```

Using effective addresses in a software managed cache therefore introduces unnecessary overhead to the cache lookup function, in that the effective address must be calculated for each cache lookup. With the introduction of 64-bit addressing, this problem has become a significant contributor to latency. For example, in a 64-bit address space, calculating the effective address requires at least one 64-bit add. On a simple processing unit lacking a full set of 64-bit integer arithmetic instructions, this single addition may require multiple processing steps.

Having calculated the effective address, a typical "cache read" operation follows the following general structure, illustrated in exemplary C/C++ code:

```
cache_read(ea)
{
    /* STEP 2: clear low order bits to ensure cacheline alignment. */
    ea_aligned = ea & ~CACHELINE_MASK;
    /* STEP 3: hash 'ea' into cache directory. */
    set = (ea >> NR_SETS_SHIFT) & NR_SETS_MASK;
    /* STEP 4: compare against cache dir. */
    found = (cache_dir[set] == ea_aligned) ? TRUE : FALSE;
    /* STEP 5: get data, on assumption of hit */
    data = cache_data(set, ea & CACHELINE_MASK);
    /* STEP 6: handle miss, if needed. */
    if (!found) data = cache_miss (ea);
    return data;
}
```

One skilled in the art will understand that in some cases, and for 64-bit effective addresses especially, a simple processing unit may also require additional processing steps to break the effective address into high and low components, and to perform separate hash functions on each component. This introduces further latency and power consumption.

Thus, as systems continue to develop and employ longer bit sequences in addressing, the latencies and extra processing steps required by conventional software caching approaches using effective addresses will become a still greater problem.

Therefore, there is a need for a system and/or method for a software managed cache that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

A method for implementing a software-managed cache comprises determining an object identifier (ID) for each of a first set of objects of a plurality of objects resident in a local memory, to generate a first cache table, the first cache table comprising a plurality of entries. Each object comprises an object ID and an effective address. The method receives a request for an object, the request comprising an object ID. The method compares the received object ID with the entries in the first cache table. In the event the received object ID matches an entry in the first cache table, the method returns the matching entry in response to the request. In the event the received object ID does not match an entry in the first cache table, the method calculates an effective address in the local memory of the object associated with the object ID.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
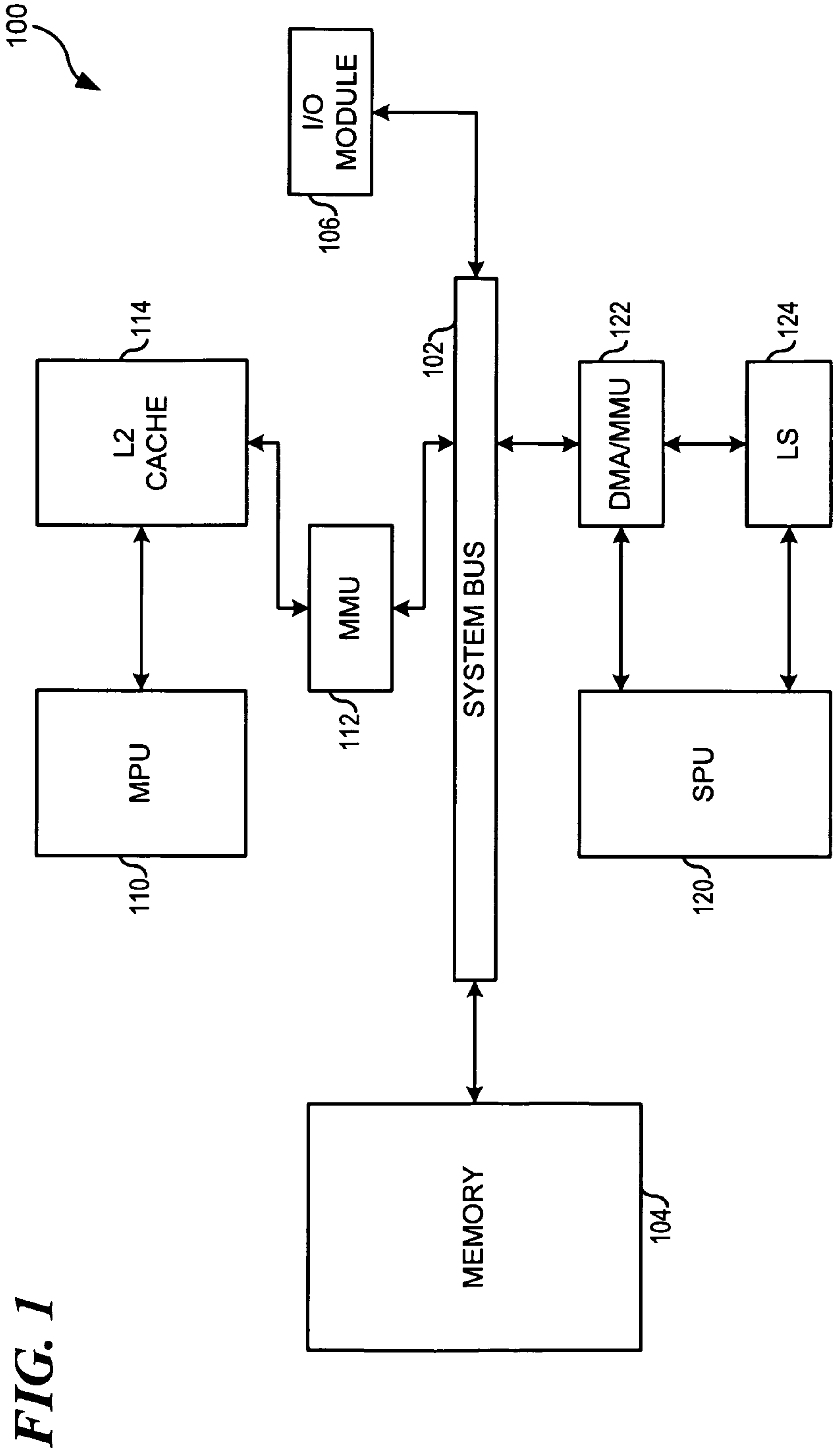
FIG. 1 illustrates a block diagram showing a common multiprocessing environment in accordance with the Prior Art.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 2:
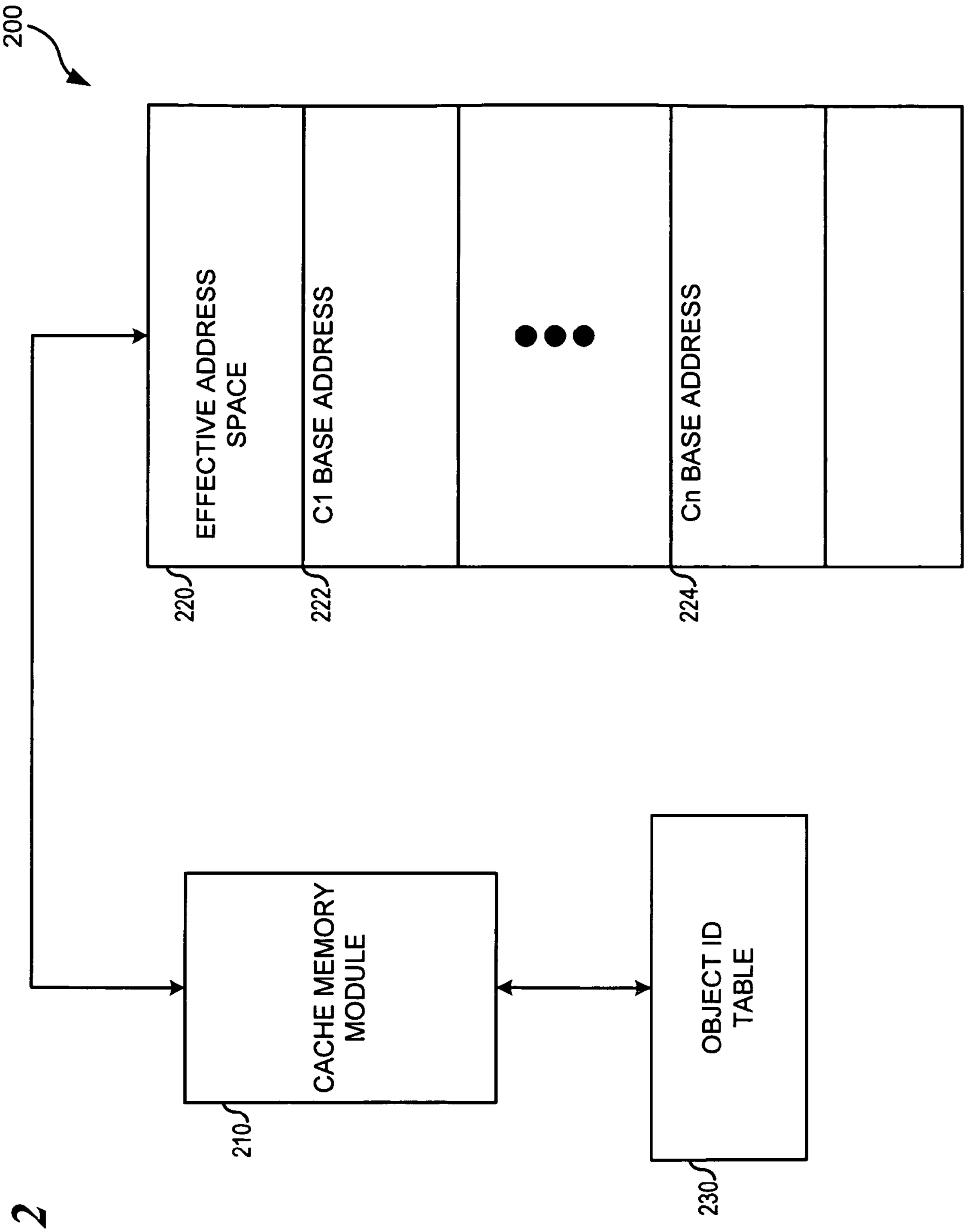
FIG. 2 illustrates a block diagram showing an improved software managed cache system in accordance with a preferred embodiment.

Referring now to the drawings, FIG. 2 is a high-level block diagram illustrating certain components of a system 200 for an improved software managed cache, in accordance with a preferred embodiment of the present invention. System 200 comprises a cache memory module 210.

Cache memory module 210 is an otherwise conventional cache memory module, modified as described below. More specifically, cache memory module 210 implements a software managed cache in effective address space 220. In one embodiment, cache memory module 210 is part of an SPU, such as SPU 120 of FIG. 1 and effective address space 220 is main memory, such as memory 104. In an alternate embodiment, effective address space 220 is a portion of local store 124. In one embodiment, cache memory module 210 also employs an object identifier (ID) table 230.

In one embodiment, cache memory module 210 can be configured to implement a software managed cache according to the following exemplary C/C++ code:

```
    /* STEP 1: skipped. */
cache__read(base, ID)
{
    /* STEP 2: clear low order bits to ensure cacheline alignment. */
    ID__shift = ID >> CACHED__ITEMS__PER__LINE__SHIFT;
    /* STEP 3: hash 'ID' into cache directory. */
    set = ID__shift & NR__SETS__MASK;
    /* STEP 4: compare against cache dir. */
    found = (cache__dir[set] == ID__shift) ? TRUE : FALSE;
    /* STEP 5: get data, on assumption of hit */
    data = cache__data(set, ID);
```

-continued

```
    /* STEP 6: handle miss, if needed. */
    if (!found) data = cache__miss (base, ID);
    return data;
}
```

And the array summation loop described above becomes:

```
for (i=0; i<number__of__elements; i++)
    sum += cache__read(a, i);
```

One skilled in the art will appreciate that the steps not performed illustrate some of the advantages over the prior art approach.

For example, cache memory module 210 avoids effective address calculation, except in the case of a cache miss. As a cache miss is typically less frequent than a cache hit, cache memory module 210 immediately improves performance by eliminating at least one addition from the instruction stream.

Further, as illustrated, system 200 can be configured to support more than one software managed cache in a single effective address space. As shown, cache memory module 210 can be configured to maintain a first cache (C1) at C1 base address 222, followed by a plurality of additional caches up to the $n^{th}$ cache (Cn), at Cn base address 224. Thus, each application can maintain its own software managed cache, employing a subset of the total effective address space.

Figure 3:
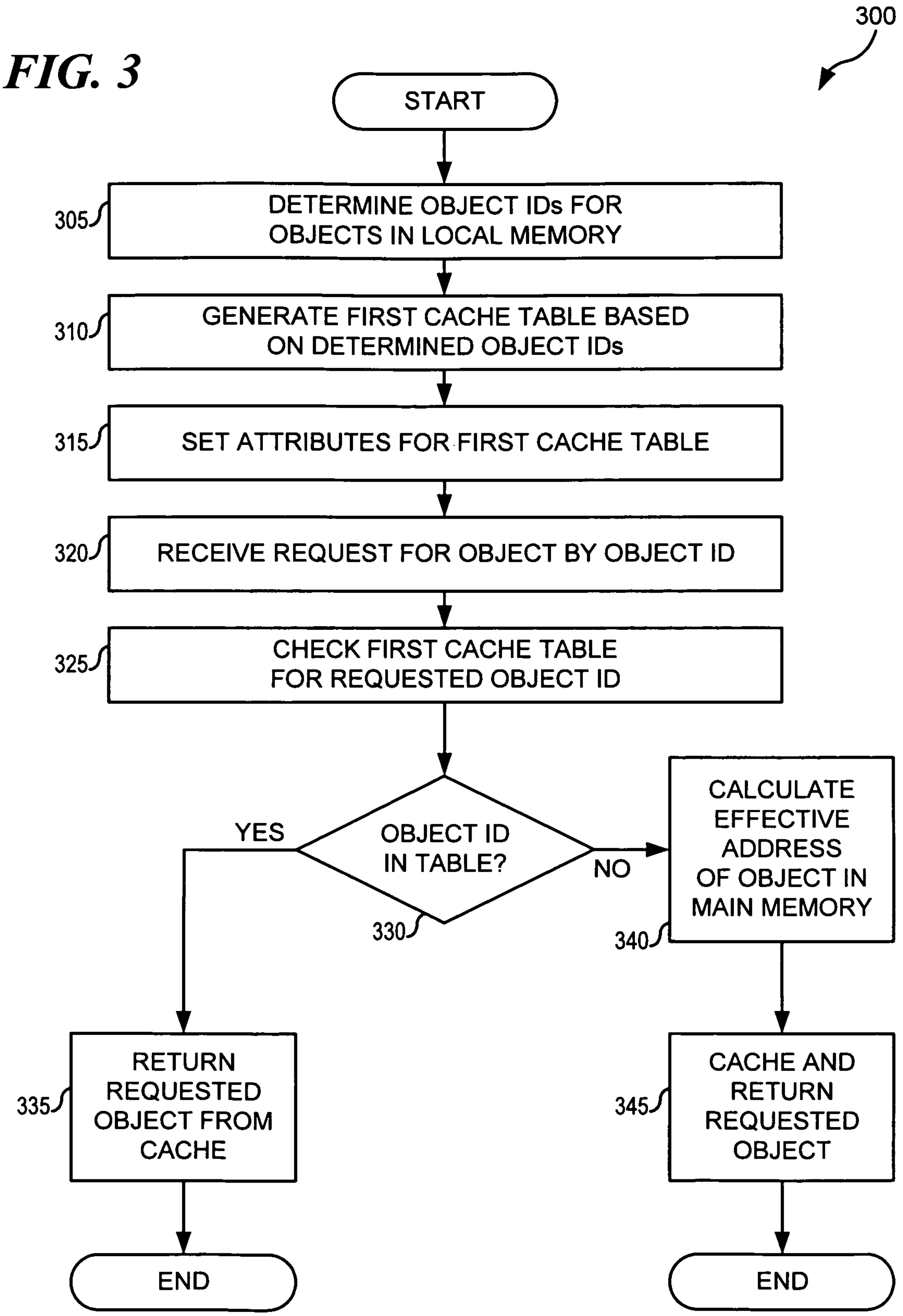
FIG. 3 illustrates a high-level flow diagram depicting logical operational steps of an improved software managed cache method, which can be implemented in accordance with a preferred embodiment.

FIG. 3 illustrates cache memory module 210 in general operation in one embodiment, as may be implemented as in the example code above. Specifically, FIG. 3 illustrates a high-level flow chart 300 that depicts logical operational steps performed by, for example, system 200 of FIG. 2, which may be implemented in accordance with a preferred embodiment. Generally, cache memory module 210 performs the steps of the method, unless indicated otherwise.

As indicated at block 305, the process begins, wherein system 200 determines object IDs for the objects in local memory. For example, cache memory module 210 identifies the objects in the designated cache subset of local memory and determines the object IDs of those objects in the cache. In one embodiment, each object in the cache comprises and can be referenced by an effective address and an independent object ID. In an alternate embodiment, the object ID is the output of a hash function whose input is the object identifier assigned by the system. In an alternate embodiment, the object ID is a function of the effective address. In an alternate embodiment, the effective address comprises a base address and the object ID. In a specific embodiment, the effective address is a 64-bit address and the object ID is a 32-bit identifier. One skilled in the art will understand that system 200 can be configured with a specific number of bits for the effective address and/or the object ID, which can be configured to optimize performance or other characteristics of system 200.

Next, as indicated at block 310, system 200 generates a first cache table based on the determined object IDs. In one embodiment, system 200 maintains a separate directory of object IDs with corresponding local store addresses configured as an offset to a base address in the local store. In an alternate embodiment, system 200 implements the first cache table as the cache subset of the local store, storing the cached data and the object ID in the same cache entry. In an alternate embodiment, system 200 generates a first cache table based on a hash function operation on the determined object IDs. In one embodiment, system 200 maintains a separate directory of hashed object IDs with corresponding local store addresses.

Next, as indicated at block 315, system 200 sets attributes for the first cache table. Generally, attributes include read/write permissions, cache size, cache configuration information such as the cache line size and associativity, and other suitable attributes. In one embodiment, system 200 independently sets attributes for each of a plurality of cache tables. As such, system 200 can configure the attributes of any particular cache table for application performance optimization.

Next, as indicated at block 320, system 200 receives a request for an object. In the illustrated embodiment, the request comprises an object ID. Next, as indicated at block 325, system 200 checks the first cache table for the requested object ID. In one embodiment, system 200 also hashes the object ID to obtain a predicted directory entry.

Next, as indicated at decisional block 330, system 200 determines whether the requested object ID is in the first cache table, and therefore whether the requested object data is in the software managed cache. If at decisional block 330 the requested object ID is in the first cache table, the process continues along the YES branch to block 335. Next, as indicated at block 335, system 200 returns the requested object from the cache and the process ends.

If at decisional block 330 the requested object ID is not in the first cache table, the process continues along the NO branch to block 340. Next, as indicated at block 340, system 200 calculates the effective address of the requested object in main memory. In an alternate embodiment, where the effective address space is the local store or a portion thereof, system 200 calculates the effective address of the requested object in the local store. Next, as indicated at block 345, system 200 caches and returns the requested object and the process ends.

Therefore, generally, a system implementing the process described in FIG. 3, such as cache memory module 210, for example, implements an object ID cache. The object ID cache contains a directory of object IDs (such as table 230 for example) identifying cached objects. Instead of calculating an effective address for each cache access, as is done in conventional systems, the cache lookup function described herein searches the directory of object IDs. One skilled in the art will understand that cache memory module 210 therefore only calculates the effective address for the object in the event of a cache miss, which significantly reduces the number of additions required to access the cache in general.

Accordingly, the novel embodiments disclosed herein implement a software managed cache that includes improved features as compared to a conventional software managed cache. As such, the disclosed embodiments provide numerous advantages over other methods and systems. For example, because the disclosed embodiments only calculate an effective address in the event of a cache miss, the disclosed embodiments improve performance by eliminating at least one addition from the instruction stream.

Further, in systems employing 64-bit addressing, the disclosed embodiments eliminate 64-bit arithmetic from performance sensitive paths in both the cache and application code. Thus, the system allows 64-bit arithmetic to be eliminated from application code as the compiler/programmer no longer needs to pass 64-bit addresses to the cache lookup function. Further, the cache lookup function does not require a 64-bit match, but can instead match a smaller number of bits, such as a 32-bit object ID, for example. Additionally, in one embodiment, the function (object ID*sizeof (cached data)) expands the addressable range of the cache beyond 4 Gbit.

Additionally, the embodiments disclosed herein defer large arithmetic computations to the cache miss handler, instead of requiring a full effective address calculation for every cache access. The cache miss handler, therefore, calculates (base address+(object ID*sizeof (cached data))) (the effective address) only in the event of a cache miss. One skilled in the art will understand that a well-designed cache experiences a cache miss significantly less frequently than a cache hit. As such, the calculation burden shifts to the unexpected code path, in which the execution time is already dominated by latency to memory.

Further, the disclosed embodiments support multiple caches on local memory, each individually configured. As such, object IDs are relative to a specific base address for each cache, and the disclosed embodiments do not implement a generic cache against the entire effective address range. Accordingly, the individual cache attributes and performance, such as aliasing and coherency issues, for example, can be configured by the applications themselves. The disclosed embodiments can also be configured for compiler-directed support, declaring that a memory reference is to a remote, rather than local, memory location. For example, a compiler can interpret a special type qualifier (e.g., the "_ea" in (_ea float*a=(_ea float*) argv[1];)) to indicate that certain memory references are remote and should be accessed via the cache. Thus, the disclosed embodiments improve application performance generally by supporting customization of the software cache to optimize application performance.

Therefore, generally, the disclosed embodiments allow a software managed cache to operate against a 64-bit address space with minimal (if any) performance degradation. Further, while the disclosed embodiments are well suited to a 64-bit addressing environment, the cached data can be configured with any structure with suitable size or alignment. Thus, the addressable cache range can be expanded from 4 Gbit to an application-defined limit. For example, hashing IDs into an array of 16-byte aligned data elements gives an additional 4 bits of address space, for a total of 64 Gbit. One skilled in the art will understand that the larger the sizeof (data element), the larger the addressability out of the cache.

Finally, the disclosed embodiments support a cache directory size that need not expand to accommodate 64-bit address lookups, which can improve the performance of existing cache structures. Moreover, the system presents hardware cache layers with post-translation addresses (from, for example, the DMA/MMU). Accordingly, the disclosed embodiments can be configured to operate with a wide variety of hardware configurations.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method for implementing a software-managed cache, comprising:

determining an object identifier (ID) for each object within a first set of objects in a cache of a plurality of objects resident in a memory, to generate a first cache table, the first cache table comprising a plurality of entries;

wherein each object comprises an object ID and an effective address;

wherein the first cache table comprises a hashed object ID for each stored object based on a hash function operation on each of the determined object IDs;

setting attributes for the first cache table, wherein the attributes are configured for performance optimization of an application;

receiving a request for an object, the request comprising an object ID;

comparing a hashed object ID based on the received object ID with the entries in the first cache table;

in the event the hashed object ID matches an entry in the first cache table, returning the matching entry in response to the request; and in the event the hashed object ID does not match an entry in the first cache table, calculating an effective address in the memory of the object associated with the object ID.

2. The method of claim 1, further comprising:

determining an object identifier (ID) for each object within a second set of objects of the plurality of objects resident in the memory, to generate a second cache table, the second cache table comprising a plurality of entries; and in the event the hashed object ID does not match an entry in the first cache table, calculating an effective address in the memory of the object associated with the object ID.

3. The method of claim 1, wherein the effective address is an address in a non-local memory.

4. The method of claim 1, wherein the object ID is a function of the effective address.

5. The method of claim 1, wherein the effective address comprises a base address and the object ID.

6. The method of claim 1, wherein each object ID comprises 32 bits and each effective address comprises 64 bits.

7. The method of claim 1, further comprising selecting an attribute setting for the first cache table, wherein the attribute setting comprises one of: read/write permissions, associativity, line size, and table size.

8. A software-managed cache system, comprising:

a processing unit;

a memory accessible by the processing unit; and a cache management module configured to receive an object identifier (ID) and to return data from the memory based on the object ID;

wherein the cache management module is configured to determine an object ID for each object of a first plurality of objects in a cache to generate a first cache table comprising a plurality of entries, each object comprising an object ID and an effective address;

wherein the cache management module is configured to set attributes for the first cache table, the attributes configured for performance optimization of an application;

wherein the first cache table comprises a hashed object ID for each stored object based on a hash function operation on each of the determined object IDs;

wherein the cache management module is further configured to receive the object ID and determine if a hashed object ID based on the received object ID matches an entry in the first cache table;

wherein the cache management module is further configured to, in the event the hashed object ID matches an entry in the first cache table, return the matching entry in response to the request; and wherein the cache management module is further configured to, in the event the hashed object ID does not match an entry in the first cache table, calculate an effective address in the memory of the object associated with the object ID.

9. The system of claim 8, further comprising a second cache table comprising a plurality of entries, each entry configured to store an object of a first plurality of objects, each object comprising an object ID and an effective address.

10. The system of claim 8, wherein the object ID is a function of the effective address.

11. The system of claim 8, wherein the effective address comprises a base address and the object ID.

12. The system of claim 8, wherein each object ID comprises 32 bits and each effective address comprises 64 bits.

13. A computer program product for implementing a software managed cache, the computer program product having a non-transitory computer-readable medium with a computer program embodied thereon, the computer program comprising:

computer code for determining an object identifier (ID) for each object within a first set of objects in a cache of a plurality of objects resident in a memory, to generate a first cache table, the first cache table comprising a plurality of entries;

wherein each object comprises an object ID and an effective address;

wherein the first cache table comprises a hashed object ID for each stored object based on a hash function operation on each of the determined object IDs;

computer code for setting attributes for the first cache table, the attributes configured for performance optimization of an application;

computer code for receiving a request for an object, the request comprising an object ID;

computer code for comparing a hashed object ID based on the received object ID with the entries in the first cache table;

computer code for, in the event the hashed object ID matches an entry in the first cache table, returning the matching entry in response to the request; and computer code for, in the event the hashed object ID does not match an entry in the first cache table, calculating an effective address in the local memory of the object associated with the object ID.

14. The computer program product of claim 13, further comprising:

computer code for determining an object identifier (ID) for each object within a second set of objects of the plurality of objects resident in the memory, to generate a second cache table, the second cache table comprising a plurality of entries; and computer code for, in the event the hashed object ID does not match an entry in the first cache table, calculating an effective address in the memory of the object associated with the object ID.

15. The computer program product of claim 13, wherein the effective address is an address in a non-local memory.

16. The computer program product of claim 13, wherein the object ID is a function of the effective address.

17. The computer program product of claim 13, wherein the effective address comprises a base address and the object ID.

18. The computer program product of claim 13, wherein each object ID comprises 32 bits and each effective address comprises 64 bits.

19. The computer program product of claim 13, further comprising selecting an attribute setting for the first cache table, wherein the attribute setting comprises one of: read/write permissions, associativity, line size, and table size.

* * * * *